United States Patent

[11] 3,602,945

| [72] | Inventors | Gerald R. Pope; Frank G. Weeden; Willard L. Petrosky; William H. Wehner, all of Houston, Tex. |
|---|---|---|
| [21] | Appl. No. | 842,185 |
| [22] | Filed | July 16, 1969 |
| [45] | Patented | Sept. 7, 1971 |
| [73] | Assignee | John L. Dore Co. Houston, Tex. |

[54] APPARATUS FOR MAKING A PLASTIC EXPANSION JOINT
3 Claims, 3 Drawing Figs.

[52] U.S. Cl. .................................................. 18/19 TM, 156/287, 264/94
[51] Int. Cl. .................................................. B29c 17/04
[50] Field of Search ........................................... 18/5 BM, 19 A, 19 TC, 19 TR, 35; 72/62; 264/94; 156/287, 293

[56] References Cited
UNITED STATES PATENTS
2,417,881  3/1947  Munger .................. 156/287 X
FOREIGN PATENTS
1,091,127  4/1965  Great Britain ............. 18/19 (TC)

*Primary Examiner*—J. Spencer Overholser
*Assistant Examiner*—Lucius R. Frye
*Attorneys*—James F. Weiler, Jefferson D. Giller, William A. Stout, Paul L. De Verter II, Dudley R. Dobie, Jr. and Henry W. Hope

ABSTRACT: Making a plastic expansion joint having not more than two convolutions with a uniform wall thickness by inserting a hollow plastic liner into a molding member and applying heat sufficiently to cause the liner to become pliable and applying fluid pressure to the inside of the heated liner whereby the liner will assume the shape of the internal configuration of the member and simultaneously applying an axial force against both ends of the liner thereby pushing the liner into the member allowing the liner to maintain a uniform wall thickness as it assumes the internal shape of the molding member. An apparatus for making a plastic-lined expansion joint from a corrugated expansion joint having flanges at each end and a heated hollow plastic liner positioned therein with the liner ends extending out of the joint and including support means fixedly holding the ends of the expansion joint relative to each other with first and second end plugs engaging opposite ends of the plastic liner. One of the plugs including an air passageway for applying forming pressure inside of the liner. A flare sleeve encircling each end of the liner for supporting the liner with the sleeve being of a length to provide a length of tubing at each end for forming a liner-sealing flange, and a sealing clamp clamping the ends of the liner to the end plugs preventing loss of fluid pressure from the liner interior.

PATENTED SEP 7 1971

Gerald R. Pope
Frank G. Weeden
Willard L. Petrosky
William H. Wehner
INVENTORS

Gerald R. Pope
Frank G. Weeden
Willard L. Petrosky
William H. Wehner
INVENTORS

APPARATUS FOR MAKING A PLASTIC EXPANSION JOINT

BACKGROUND OF THE INVENTION

Blow molding in which a plastic liner is inserted in and pressure applied to the interior of the liner causing it to assume the shape of a mold or joint is old. However, blow molding of plastic expansion joints has a disadvantage in that a reduction in the wall thickness of the liner is created. In corrugated expansion joints a nonuniform wall thickness is extremely undesirable as it decreases the strength of the expansion joint.

And in corrugated expansion joints the point which will stretch the greatest distance and bear most of the thinning, when manufactured by the conventional blow molding, is the convolution crest or peak. This causes all of the axial expansion and compression which a joint is designed to accommodate to be absorbed at the peak. Therefore, it is desirable that the liner be of uniform thickness instead of having thinner walls at the corrugated section. In addition, an expansion joint whose wall thickness is uniform will naturally exhibit a higher burst strength.

SUMMARY OF THE INVENTION

The present invention provides a plastic expansion joint having not more than two convolutions or bellows but having uniform wall thickness by assembling a hollow plastic tube in a molding member and the assembly is heated to the forming point of the liner and the inside of the liner is then pressurized to cause the now pliable liner to start to form the convolutions of the molding member. Simultaneously, pressure is exerted against both ends of the liner pushing more of the liner into the member to maintain a uniform wall thickness of the liner as it assumes the internal shape of the member.

The present invention is further directed to an apparatus for making a plastic-lined expansion joint from a metal-corrugated expansion joint having flanges at each end and a heated hollow plastic liner positioned in the joint with both ends extending out of the joint by providing support means for supporting and fixedly holding the ends of the expansion joint relative to each other with an end plug engaging each end of the plastic liner for longitudinally moving the liner ends toward each other with the plugs extending into the ends of the liner to provide internal support. A fluid passageway in one of the end plugs provides fluid pressure into the interior of the liner for causing the liner to assume the internal shape of the joint, and a flare sleeve surrounding each end of the liner providing external support to the liner with the sleeves being of the length to allow cutting of the tubing at the sleeve end for forming a liner-sealing flange about the expansion joint flange. In addition, a sealing clamp is adapted to clamp the ends of the liner to an end plug for preventing the loss of fluid pressure from the interior of the liner.

DESCRIPTION OF THE PREFERRED EMBODIMENT

Figure 1:
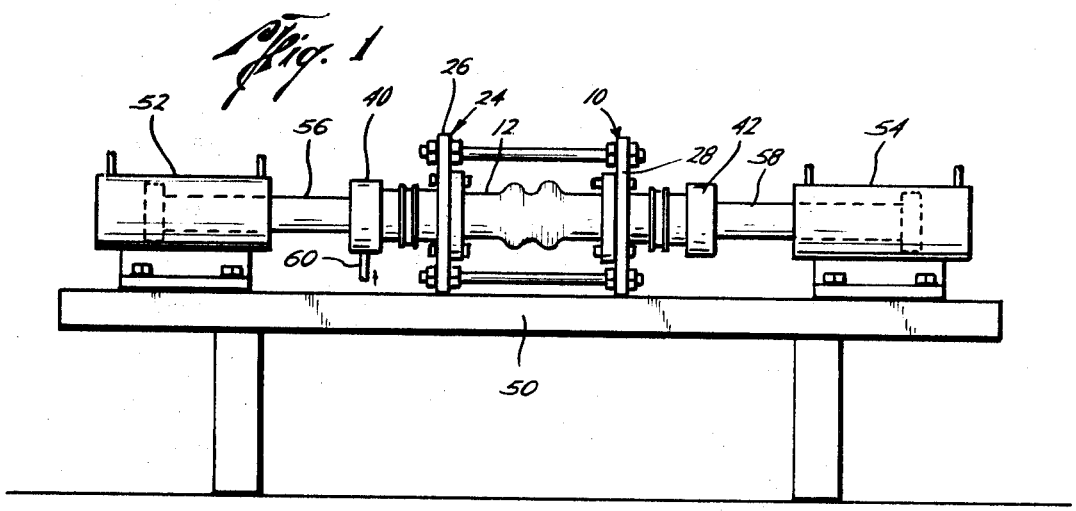
FIG. 1 is an elevational view, partly schematic, illustrating the invention of the present invention in manufacturing a corrugated plastic expansion joint.
Figure 2:
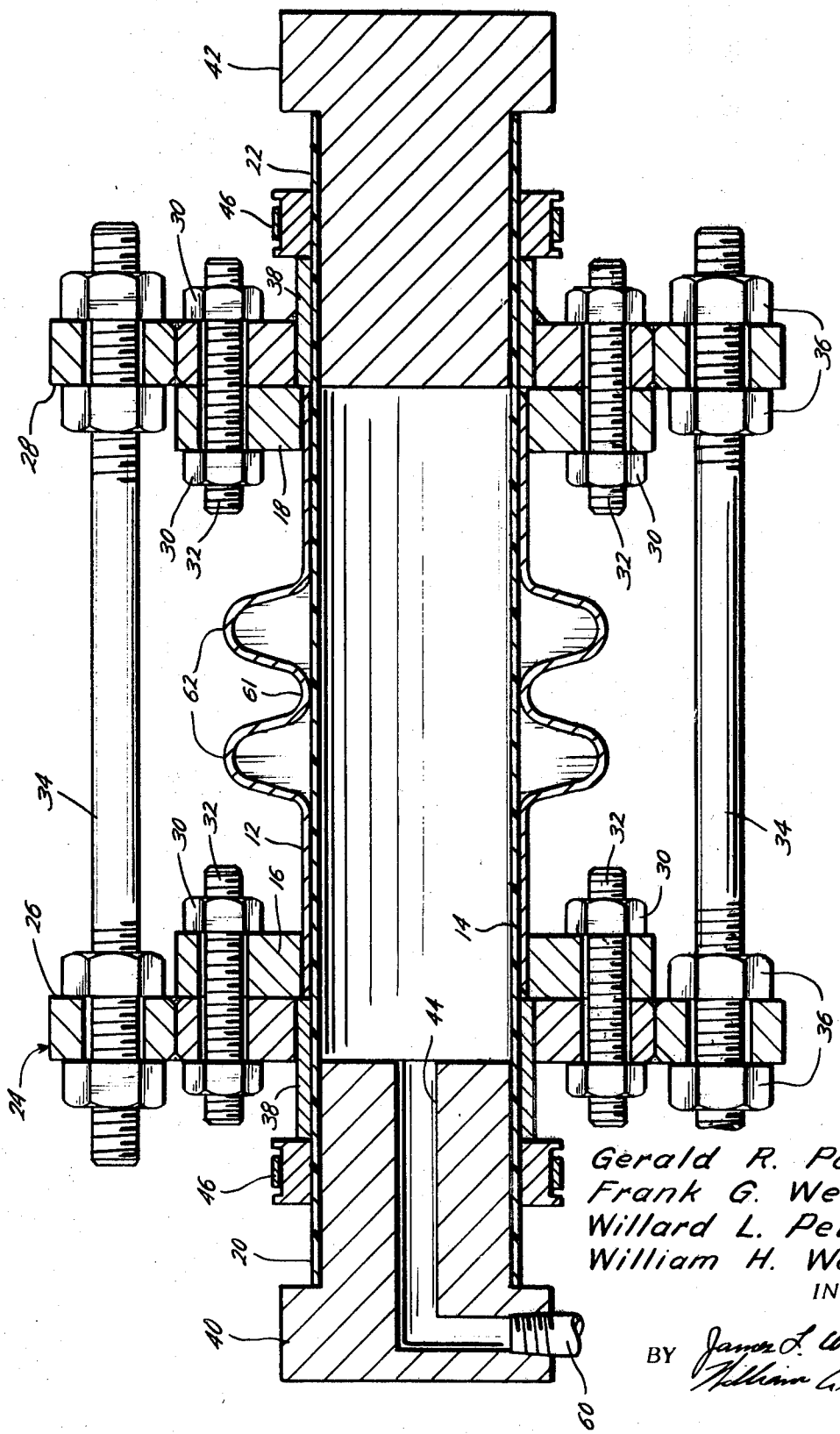
FIG. 2 is an enlarged cross-sectional view of the supporting assembly showing the position of the liner relative to the molding member upon initiation of the process.

Referring now to the drawings an d particularly to FIG. 1 and 2, the reference numeral 10 generally indicates the apparatus of the present invention for making a corrugated plastic expansion joint having not more than two convolutions or bellows from a plastic liner 14 in a suitable molding member 12.

The molding member 12 into which it is desired to place the plastic liner 14 may be merely a conventional mold and may be of any suitable type of material, but by way of example only, is shown as a corrugated metal expansion joint having end flanges 16 and 18. The plastic liner 14 is initially positioned interiorly of the joint 12 with ends 20 and 22 extending therefrom. Preferably, the liner 14 is formed of a suitable corrosion resistant resin, the particular resin being used of course, depending upon the corrosive character of the fluid or substance to be protected against. For example, fluorocarbon resins such as Teflon (polymerized tetrafluoroethylene), Fluorothene (polychlorotrifluoroethylene), Kel-F (polymerized trifluorochloroethylene), fluorinated ethylenepropylene, and other resins such as polypropylene and the like may be used.

The apparatus 10 includes a supporting structure 24 having flanges 26 and 28 with flange 26 being connected to the flange 16 of the joint 12 and flange 28 being connected to flange 18, all by a plurality of nuts and bolts 30 and 32, respectively, Additionally, the supporting flange 26 and 28 are connected together by bolts 34 and nuts 36 for holding the joint flanges 16 and 18 fixedly secured relative to each other during the manufacturing process, preferably with the bellows in the expanded position since the liner will then be more easily formed.

A flare sleeve 38 is provided abutting each end of the joint 12 adjacent the flanges 16 and 18. Sleeves 38 have an interior diameter equal to the interior diameter of the ends of the joint 12 thus encircling the exterior of each end of the liner 14 and providing external supports thereto during the blowing step of the manufacturing process. An additional function of the flare sleeve 38 will be described further hereinafter.

End plugs 40 and 42 are provided, one for each end of the liner 14 for engaging the ends 20 and 22, respectively, of the liner 14 for longitudinally moving the ends 20 and 22 toward each other during the manufacturing process as will be described more fully hereinafter. Additionally, the end plugs 40 and 42 project internally of the liner ends 20 and 22, respectively, and against the internal walls thereof for providing internal supports to the liner and thus act with the flare sleeve 38 to prevent either internal or external buckling of the ends 20 and 22 during manufacture. One of the end plugs, such as 40 included a passageway 44 for passage of a fluid such as air under pressure, for example 10 p.s.i.g. to 150 p.s.i.g., through air inlet 60 to apply a force to the interior of the liner 14 to cause the liner to assume the shape of the internal configuration of the joint 14. In addition, a horse clamp 46 may be provided about each of the exterior ends 20 and 22 of the liner 14 gripping the ends against the end plugs 40 and 42 for sealing the interior of the liner 14 thereby preventing the loss of fluid pressure from the passageway 44 around the end plugs.

The supporting means 24 after being heated for example in the range 73° F. to 550° F., preferably to 500° F. such as in an oven (not shown), to the forming temperature of the liner 14 is placed upon a support, as best seen in FIG. 1 such as a table 50 between piston and cylinder assemblies 52 and 54, which may be hydraulic or pneumatic. Thus, the piston rods 56 and 58 engage the end plugs 40 and 42, respectively, for applying a force thereto and thus against the ends 20 and 22 of the liner 14 pushing the liner into the joint 12 as air pressure is forced through inlet 60 causing the liner to move about valley 61 and into the convolution crests or peaks 62 without causing a reduction in the wall thickness of the liner 11 so long as the expansion joint has only one or two convolutions.

Figure 3:
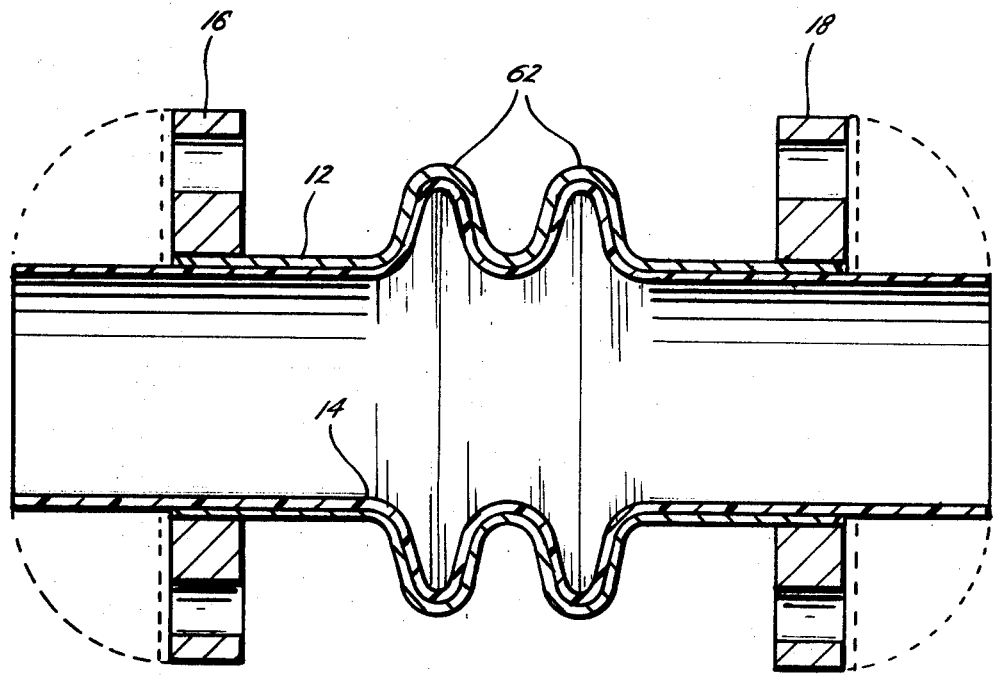
FIG. 3 is an enlarged cross-sectional view showing the liner almost completely formed without thinning of the liner wall thickness with the ends in position to be flared over the flange faces of the joint.

In use, the molding member 12, which may be a conventional mold, but here is shown as a metal expansion joint and the liner 14 are assembled as shown in FIG. 2 is the supporting means 24 and the entire assembly is heated to the forming temperature of the liner 14 which, for example if the liner was of fluorinated ethylenepropylene preferably would be heated to 500° F. A fluid pressure source such as air would be connected to the inlet 60 in the end plug 40 and the entire assembly 24 placed on the table 50 and between the cylinder and piston assemblies 52 and 54. The pressurized air inside of the liner 14 causes the now hot pliable liner 14 to begin to form into the convolutions 62 of the bellows of the joint 12. With the air pressure holding the liner in a semiformed position force is exerted by the cylinder and piston assemblies 52 and 54 against the end plugs 40 and 42, respectively, causing them to move toward each other pushing more of the liner 14 into the joint 12, about valley 61 and into the convolutions 62. As the liner 14 moves inwardly, the air pressure internally of the liner causes the liner to form into the metal bellows convolutions 62, as best seen in FIG. 3, without any reduction in the wall thickness of the liner 14. Once the periphery of the arch in the corrugated portion is completely formed, the inward travel of the end plugs 40 and 42 is stopped and the assembly is cooled.

The end plugs 40 and 42 and the hose clamps 46 are removed. As one of the features of the present invention is to provide a corrosion-resistant plastic liner to protect the expansion joint 12 and its flanges 16 and 18, it is desired to flare the ends of the liner 14 over the faces of the flanges 16 and 18 to form a sealing surface. One purpose of the flare sleeves 38 is to limit the travel of end plugs 40 and 42 to insure that a sufficient length of liner protrudes from the ends of the joint 12 to provide this flange facing. Preferably the length of the flare sleeves is made of a size so that after cooling the excess tubing may be cut off flush without further measurement being made. The outer ends of the flare sleeves 38, as shown in FIG. 3, are then flared outwardly as shown in the dotted outline over the faces of the flanges 16 and 18 to form the sealing surface. Thus, a plastic-lined metal expansion joint is quickly and easily provided in which the wall of the liner has a uniform wall thickness after forming thereby providing an expansion joint having a higher burst strength and one in which the structural strength of the expansion joint, particularly at the convolutions, is not weakened.

The present invention, therefore, is well adapted to carry out the objects and attain the ends and advantages mentioned as well as others inherent therein.

What is claimed is:

1. An apparatus for lining a corrugated expansion joint having only one or two bellows having flanges at each end with a heated hollow plastic liner positioned therein with both ends extending out of the joint flanges comprising, support means for supporting and rigidly holding the ends of the expansion joint relative to each other, first and second end plugs each of which is adapted to engage one of the ends of the plastic liner for longitudinally moving the liner ends toward each other, said plugs extending into the ends of the liner against the internal walls thereof for providing internal support to the liner, a fluid passageway in one of the end plugs to provide fluid pressure into the interior of the liner for causing the liner to assume the internal shape of the joint, means for moving both of the end plugs in an axial direction towards each other for pushing the liner into the joint as fluid pressure is applied therein thereby maintaining the wall thickness of the liner uniform, and support means encircling each end of the liner exteriorly but adjacent each end of the joint and being of an internal diameter equal to the internal diameter of the end of the joint thereby providing external support to the ends of the liner for preventing buckling of the liner as the end plugs are moved.

2. The apparatus of claim 1 including, a sealing clamp adapted to clamp the ends of the liner to an end plug for preventing the loss of fluid pressure from the interior of the liner.

3. The apparatus of claim 1 wherein the support means encircling each end of the liner is a flare sleeve positioned against each end of the joint, said sleeves being of a length to provide a length of liner at each end for forming a liner-sealing flange, said sleeves including a shoulder for limiting the axial movement of the end plugs towards each other.